(12) United States Patent
Zehnder et al.

(10) Patent No.: US 11,345,188 B2
(45) Date of Patent: May 31, 2022

(54) SINGLE PIECE HEAVY DUTY WHEEL

(71) Applicant: Arconic Inc., Pittsburgh, PA (US)

(72) Inventors: Craig M. Zehnder, Akron, OH (US);
Gabriele F. Ciccola, Hudson, OH (US);
Grant DeGeorge, Strongsville, OH (US);
Santosh Prasad, Murrysville, PA (US);
Henry Sklyut, Delmont, PA (US);
Anton Rovito, Parma, OH (US);
Christopher J. Tan, Broadview Heights, OH (US); Jay H. Goodman, Murrysville, PA (US)

(73) Assignee: HOWMET AEROSPACE INC.,
Pittsburgh, PA (US)

( * ) Notice: Subject to any disclaimer, the term of this patent is extended or adjusted under 35 U.S.C. 154(b) by 0 days.

(21) Appl. No.: 16/801,246

(22) Filed: Feb. 26, 2020

(65) Prior Publication Data

US 2020/0189314 A1    Jun. 18, 2020

Related U.S. Application Data

(63) Continuation of application No. PCT/US2018/050609, filed on Sep. 12, 2018.

(60) Provisional application No. 62/561,462, filed on Sep. 21, 2017.

(51) Int. Cl.
   B60B 21/10    (2006.01)
(52) U.S. Cl.
   CPC .......... B60B 21/104 (2013.01); B60B 21/106 (2013.01); *B60B 2310/202* (2013.01); *B60B 2310/208* (2013.01)

(58) Field of Classification Search
   CPC ............................ B60B 21/104; B60B 21/106
   See application file for complete search history.

(56) References Cited

U.S. PATENT DOCUMENTS

| | | | |
|---|---|---|---|
| 9,216,614 B2* | 12/2015 | Nakayama | ............ B60B 21/026 |
| 10,272,718 B1* | 4/2019 | Quan | .................... B60B 21/028 |
| 2004/0169412 A1 | 9/2004 | Cottrell et al. | |
| 2006/0202549 A1 | 9/2006 | Hodges et al. | |

(Continued)

FOREIGN PATENT DOCUMENTS

| | | | | |
|---|---|---|---|---|
| CN | 106080028 A | * | 11/2016 | ........... B60B 21/104 |
| CN | 107901699 A | * | 4/2018 | ........... B60B 21/104 |

(Continued)

OTHER PUBLICATIONS

International Search Report and Written Opinion dated Jan. 11, 2019, issued by the Korean Intellectual Property Office in application No. PCT/US2018/050609 filed Sep. 12, 2018 (14 pages).

*Primary Examiner* — Jason R Bellinger
(74) *Attorney, Agent, or Firm* — Greenberg Traurig, LLP

(57) ABSTRACT

A wheel rim including a flange profile on a tire side of an open end flange of the wheel rim, the flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between $-1.004$ to $-0.974$, aTheta2 is between $--1.049$ to $-1.0182$, aTheta3 is between $-3.601$ to $-2.760$, aTheta4 is between $18.791$ to $25.965$, and aTheta5 is between $0.185$ to $0.277$.

20 Claims, 7 Drawing Sheets

(56) References Cited

U.S. PATENT DOCUMENTS

| | | | |
|---|---|---|---|
| 2010/0096910 A1* | 4/2010 | Egbert | B60B 21/104 301/95.107 |
| 2012/0181849 A1 | 7/2012 | Rogers et al. | |
| 2015/0174955 A1 | 6/2015 | Von Tardy-Tuch et al. | |
| 2017/0050463 A1 | 2/2017 | Arnold et al. | |

FOREIGN PATENT DOCUMENTS

| | | | | |
|---|---|---|---|---|
| WO | WO-0187645 A2 * | 11/2001 | ........... | B60B 21/104 |
| WO | WO-2010098205 A1 * | 9/2010 | ........... | B60B 21/104 |
| WO | WO-2021118984 A1 * | 6/2021 | ........... | B60B 21/104 |

\* cited by examiner

SINGLE PIECE HEAVY DUTY WHEEL

CROSS-REFERENCE TO RELATED APPLICATION

The present application is a continuation application relating to and claiming the benefit of commonly-owned, co-pending International Patent Application No. PCT/US2018/050609, filed Sep. 12, 2018, entitled "SINGLE-PIECE HEAVY DUTY WHEEL", which relates to and claims the benefit of U.S. Provisional patent application No. 62/561,462 entitled, SINGLE-PIECE HEAVY DUTY WHEEL, filed Sep. 21, 2017, each of which is incorporated by reference herein in its entirety.

BACKGROUND

Conventionally, increasing design load and/or increasing target tire pressure requires increasing the size and/or thickness of one or more wheel features, using heavier, stronger materials, adding structural support elements, or combinations thereof. However, regardless of such design changes, when applied loads and tire pressures exceed certain levels, tires can demount and/or slide off the wheel rim, for example, when exposed to the lateral loads generated during vehicle turns.

SUMMARY

The present disclosure relates to a wheel rim for providing increased design load and increased tire pressure ratings. In one embodiment the wheel rim has a flange profile on a tire side of an open end flange of the wheel rim, the flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

In another embodiment, aTheta1 is −0.989, aTheta2 is 1.034, aTheta3 is −3.181, aTheta4 is 22.378, and aTheta5 is 0.231.

In another embodiment, a flange profile on an inboard side of the open end flange of the wheel rim is defined by the equation:

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} + (\text{Alpha0} + \text{Alpha1} \cdot X_2 + \text{Alpha2} \cdot X_2^2 + \text{Alpha3} \cdot X_2^3)$$

wherein, for $0 \leq X_2 \leq 1$, bTheta1 is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

In another embodiment, bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

In another embodiment, the wheel has a third flange profile connecting the first flange profile and the second flange profile, the third flange profile having a first portion and a second portion, wherein:

the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < y_3$.

In another embodiment, Beta0 is −611.42, Beta1 is 2659.212, Beta2 is −4287.640, Beta3 is 3047.873, and Beta4 is −807.023.

In another embodiment, the wheel has a disc end flange mirroring the open end flange.

In another embodiment, the wheel has a first angle wall extending from the disc end flange toward the open end flange; a second angle wall extending from the open end flange toward the disc end flange; and a drop well connecting the first angle wall and the second angle wall.

In another embodiment, the wheel has a mounting flange extending radially inward from the disc face, the mounting flange having a plurality of bolt holes.

In another embodiment, the wheel rim is formed from at least one of steel, aluminum, steel alloys, aluminum alloys, or combinations thereof.

In another embodiment, the wheel exhibits a maximum load rating increase by a factor of 1.5 with a corresponding increase in the weight of the wheel by a factor of 1.3 over a wheel with a standard geometry.

In another embodiment, the wheel exhibits a maximum tire pressure rating by a factor of 1.375 with a corresponding increase in the maximum tire pressure rating of the wheel by a factor of 1.298 over a wheel with a standard geometry.

In another embodiment, a method for making a wheel includes forming the wheel by at least one of forging or casting the wheel, the wheel having a disc face at a disc end, an opposing open end, and a wheel rim extending between the disc face and the open end, the wheel rim including a flange profile on a tire side of an open end flange of the wheel rim, the flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

In another embodiment, aTheta1 is −0.989, aTheta2 is 1.034, aTheta3 is −3.181, aTheta4 is 22.378, and aTheta5 is 0.231.

In another embodiment, the step of forming further comprises forming a flange profile on an inboard side of the open end flange of the wheel rim, the flange profile defined by the equation:

$$y_2 = \left(bv1 + \frac{1}{(1 + \text{Exp}(b\text{Theta3} + b\text{Theta4} \cdot X_2))^{b\text{Theta5}}}\right) \cdot b\text{Theta2} +$$
$$(\text{Alpha0} + \text{Alpha1} \cdot X_2 + \text{Alpha2} \cdot X_2^2 + \text{Alpha3} \cdot X_2^3)$$

wherein, for $0 \leq X_2 \leq 1$, bTheta1 is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

In another embodiment, bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

In another embodiment, the step of forming further comprises forming a third flange profile connecting the first flange profile and the second flange profile, the third flange profile having a first portion and a second portion, wherein: the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < y_3$.

In another embodiment, the wheel rim further comprises a disc end flange mirroring the open end flange.

In another embodiment, the wheel is forged or cast from at least one of steel, aluminum, steel alloys, aluminum alloys, or combinations thereof.

In another embodiment, $X_4 = 1$.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1A:
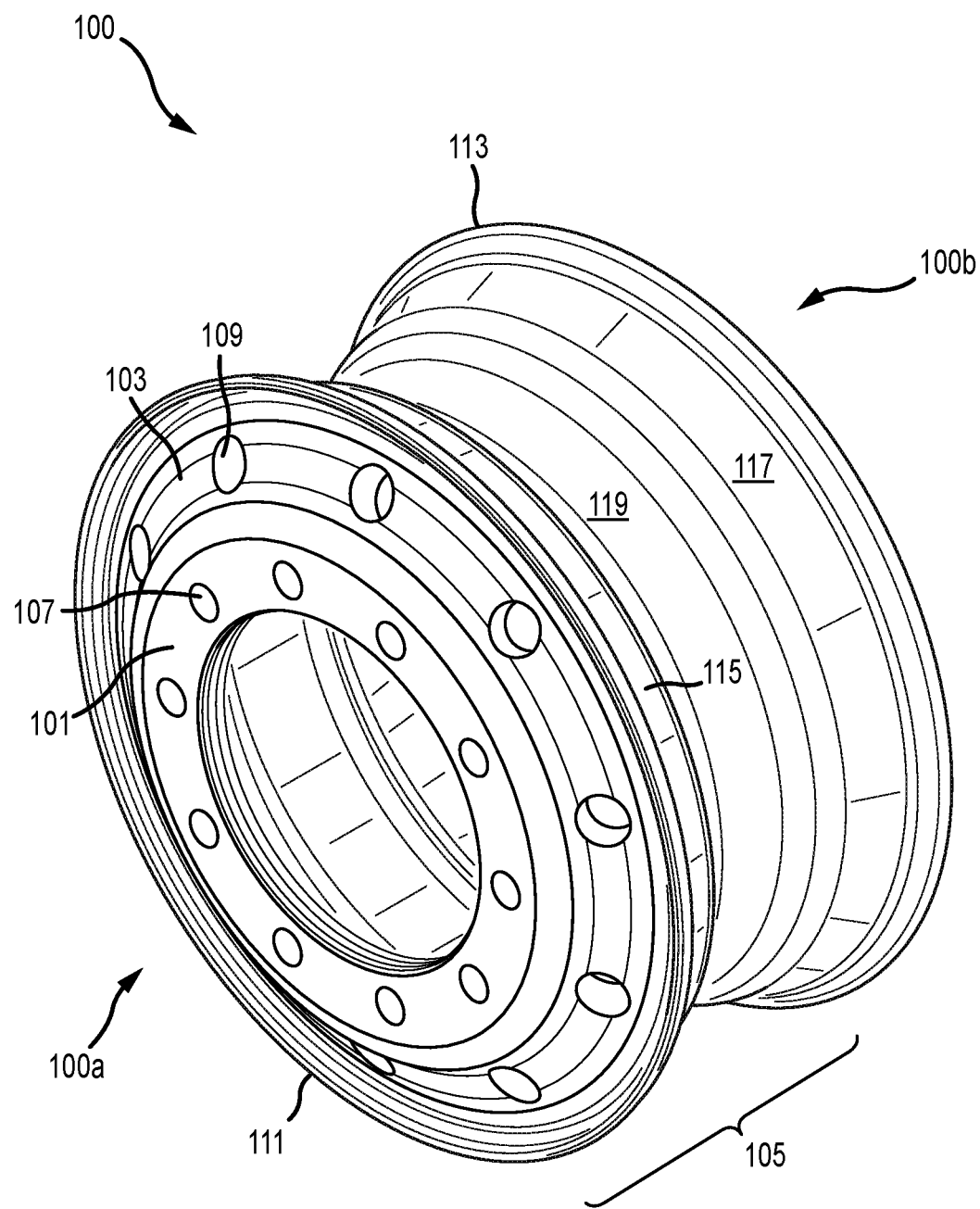
FIGS. 1A-1F are perspective, front, back, side, top, and cross-sectional views of a wheel in accordance with various embodiments.
Figure 1B:
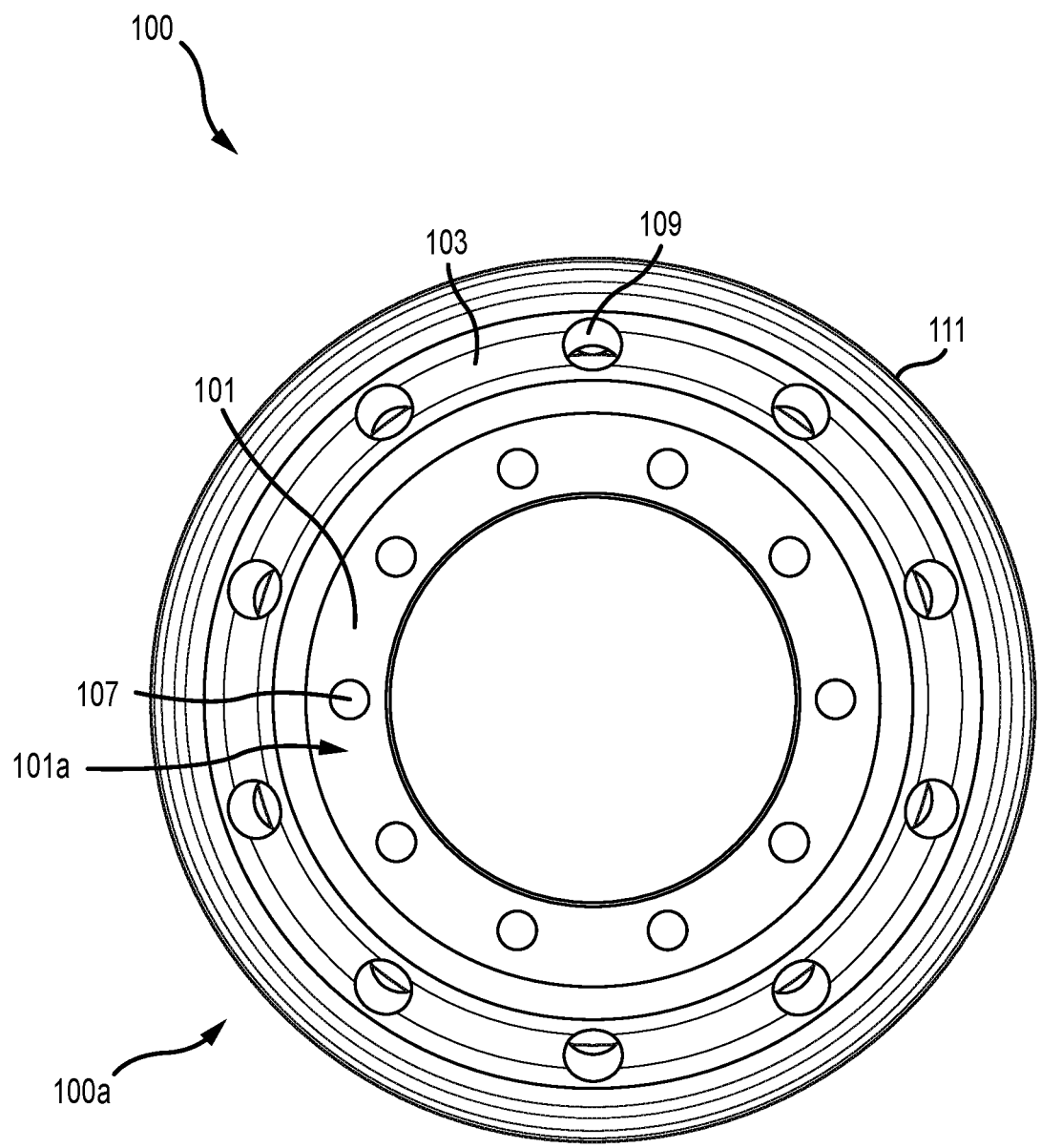

Various exemplary embodiments will be described more fully hereinafter with reference to the accompanying drawings, in which some example embodiments are shown. The present inventive concept may, however, be embodied in many different forms and should not be construed as limited to the example embodiments set forth herein. Rather, these example embodiments are provided so that this disclosure will be thorough and complete, and will fully convey the scope of the present inventive concept to those skilled in the art. In the drawings, the sizes and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the present disclosure generally apply to wheels. The various embodiments of the present disclosure can provide single piece heavy duty wheels having a high load rating and a high tire inflation pressure rating for use in connection with wheeled vehicles such as, for example, cars, trucks, buses, aircraft landing gear, amphibious vehicles, or any other wheeled vehicle.

FIGS. 1A-1F illustrate a wheel 100 having a disc end 100a and an opposing open end 100b in accordance with various embodiments of the present disclosure. The wheel 100 can include a mount flange 101 at the disc end 100a extending radially inward from a disc face 103 for mounting the wheel 100 to a wheel hub (not shown). The wheel 100 can also include a wheel rim 105 extending between the disc face 103 and the open end 100b.

The mount flange 101, in accordance with various embodiments, can include one or more bolt holes 107 extending there through for bolting or otherwise fastening the wheel 100 to the wheel hub. Although the mount flange 101 is shown in FIGS. 1A-1F as having 10 bolt holes 107, it will be apparent in view of this disclosure that any number and/or size bolt holes 107 can be used in accordance with various embodiments to permit engagement between the mount flange 101 and any complimentary wheel hub design.

Figure 1C:
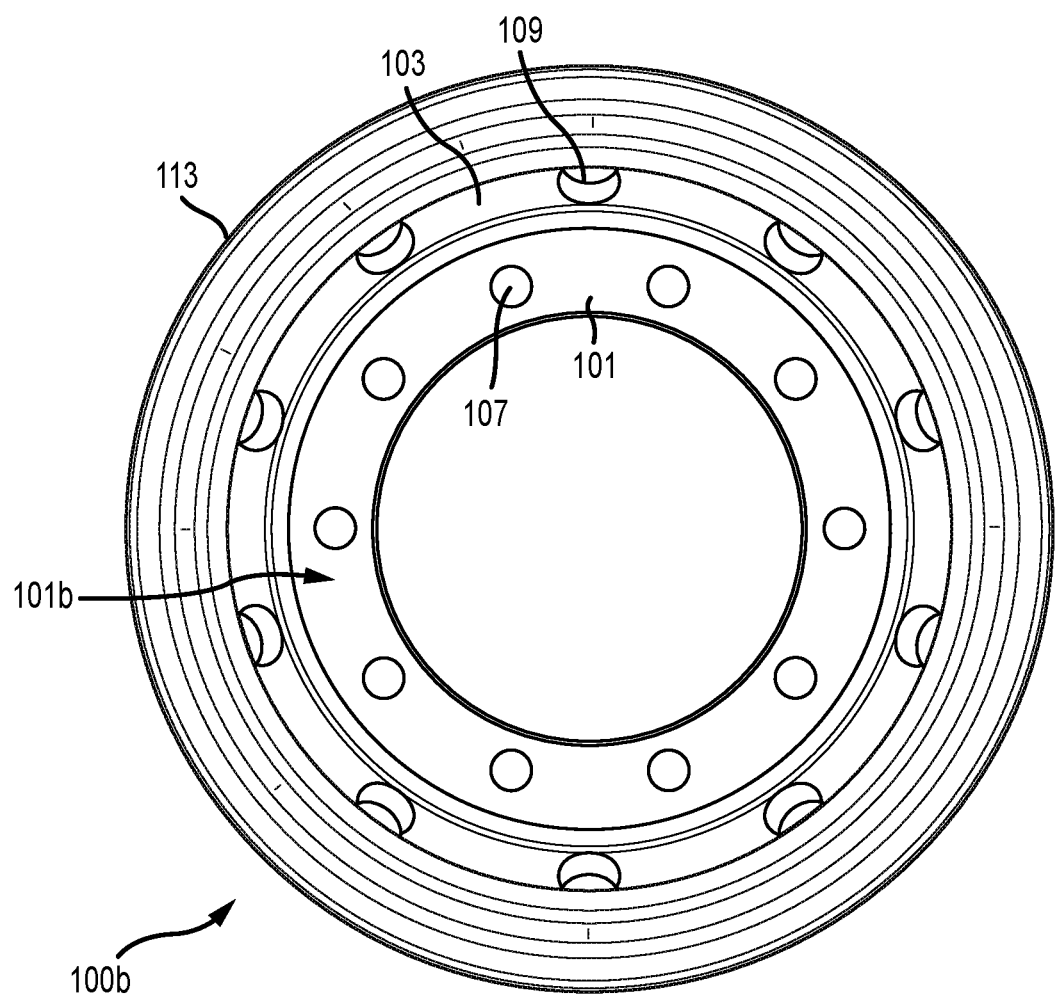
Figure 1D:
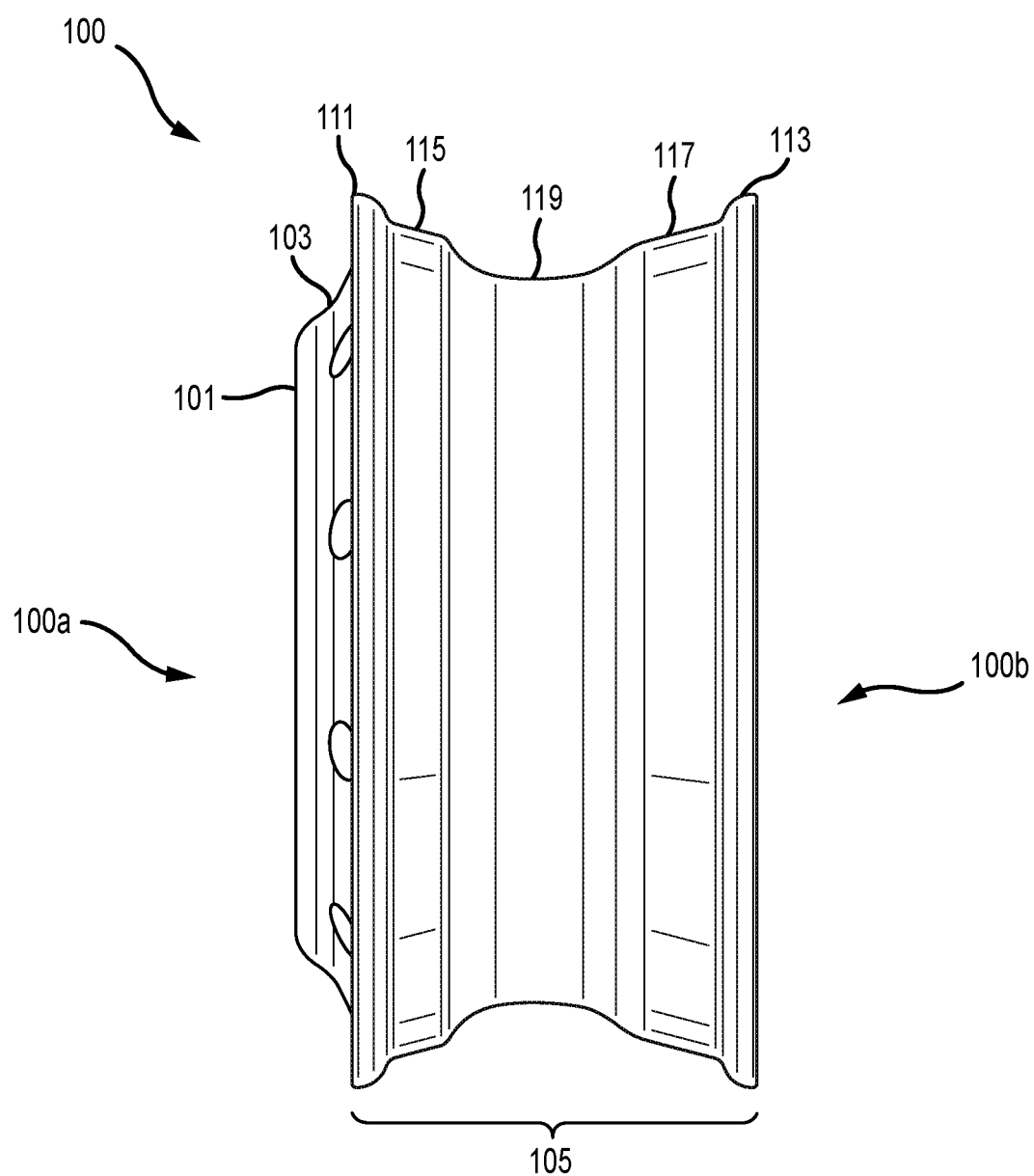
Figure 1E:
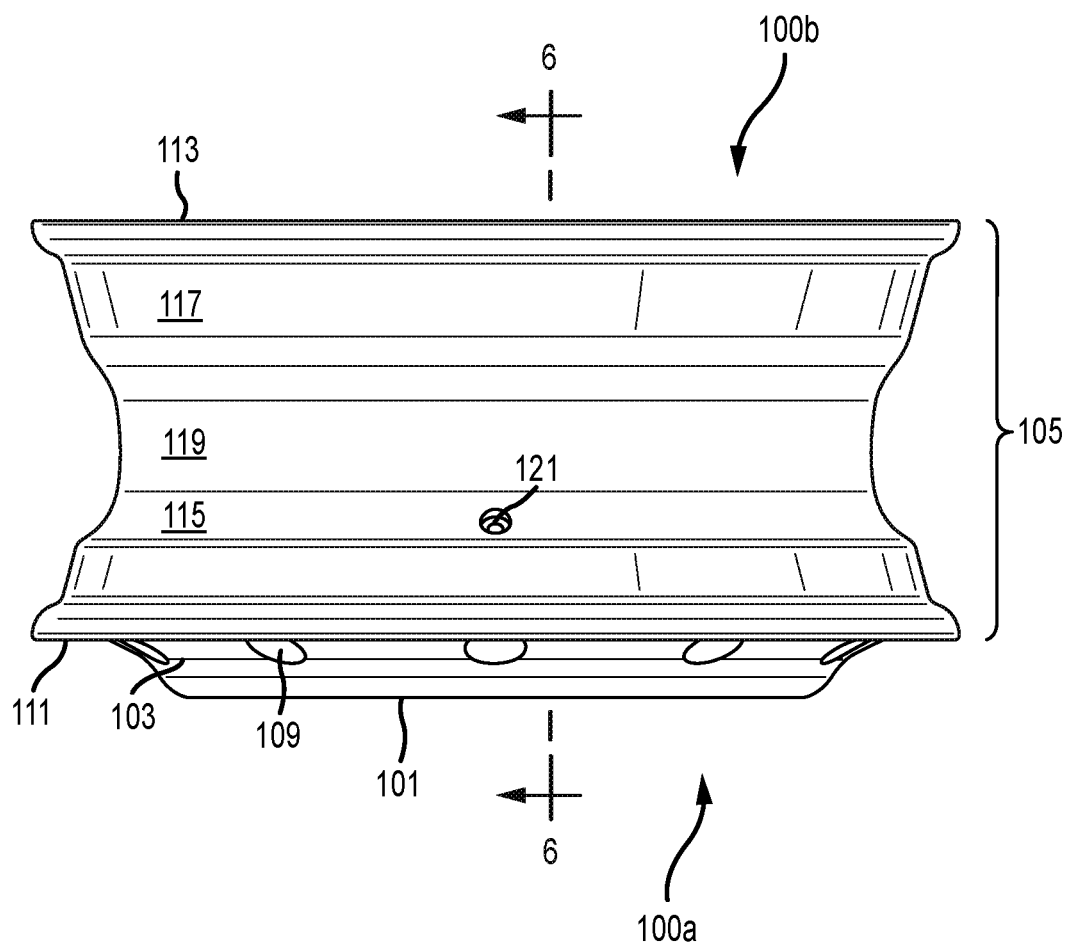
Figure 1F:
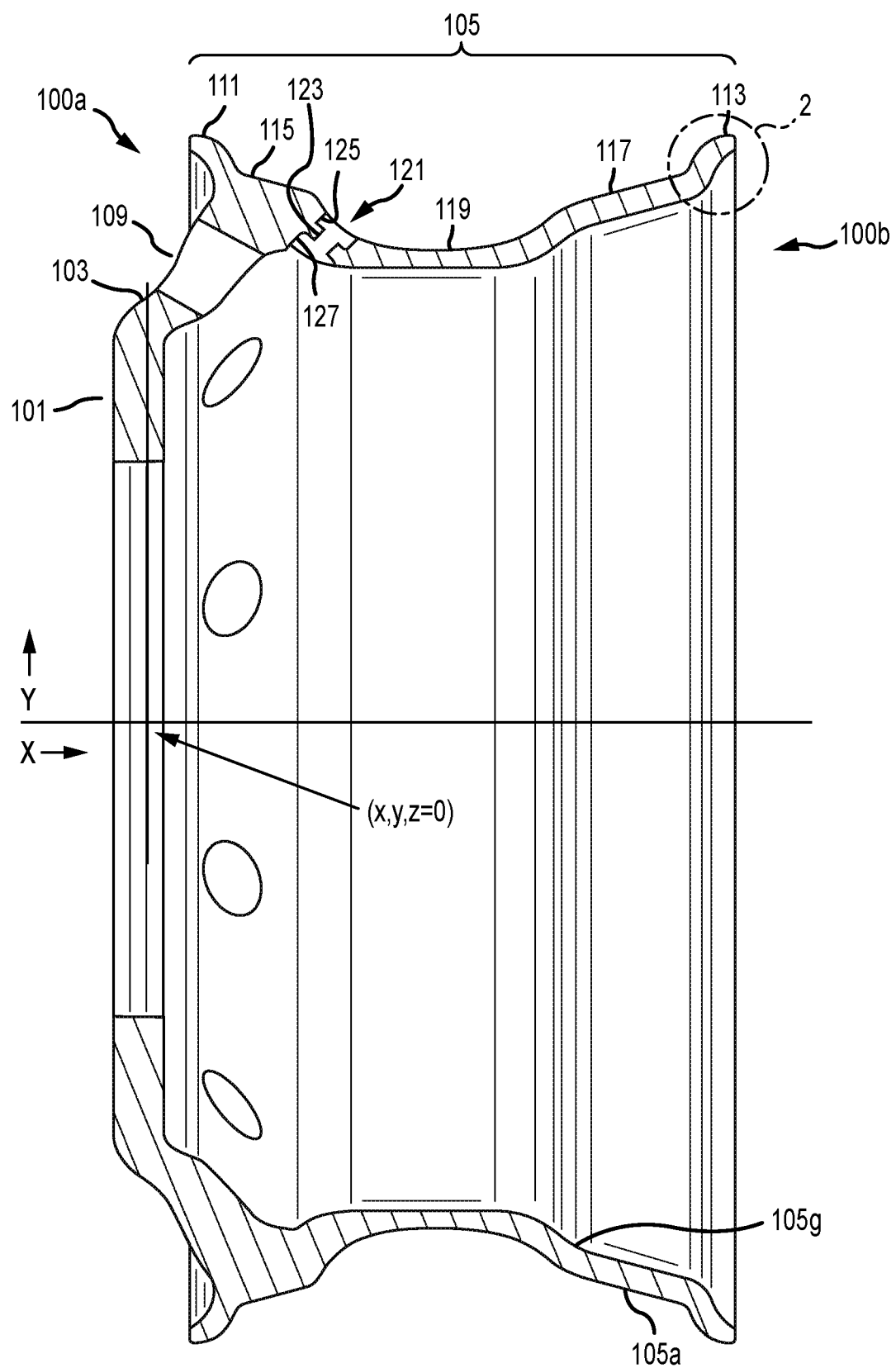

As shown in FIGS. 1A, 1B, 1D, and 1E, the mount flange 101, in accordance with various embodiments, can include a substantially planar outer face 101a for providing a stable bearing surface for engagement with one or more bolt heads of one or more bolts when the wheel 100 is bolted to the wheel hub. As shown in FIGS. 1C and 1F, the mount flange 101, in accordance with various embodiments can also include a substantially planar inner face 101b for providing a stable bearing surface for engagement with the wheel hub when the wheel 100 is bolted to the wheel hub.

As shown in FIGS. 1A, 1D, 1E, and 1F, the disc face 103, in accordance with various embodiments, can extend substantially conically between the mount flange 101 and the wheel rim 105 for providing a transition and structural support between the wheel rim 105 and the mount flange 101. The disc face 103, in accordance with various embodiments, can include one or more hand holes 109 extending there through for permitting handling of the wheel, for providing cooling ventilation to a brake or brakes proximate the wheel, and/or for providing accessibility to a valve hole for inflation and valve installation. Although the disc face 103 is shown in FIGS. 1A-1F as having 10 hand holes 109, it will be apparent in view of this disclosure that any number and/or size hand holes 109 can be used in accordance with various embodiments.

The wheel rim 105, in accordance with various embodiments, can be configured for mounting a tire thereto. The wheel rim 105 can, in accordance with various embodiments, include an outer "tire side" 105 a and an inner "inboard side" 105g. In some embodiments, the wheel rim 105 can include a disc end flange 111 at the disc end 100 a, an open end flange 113 at the open end 100 b, a first angle wall 115 extending from the disc end flange 111 toward the open end flange 113, a second angle wall 117 extending from the open end flange 113 toward the disc end flange 111, and a drop well 119 connecting the first angle wall 115 to the second angle wall 117. In some embodiments, the wheel rim 105 can also include a valve hole 121 extending through at least one of the first angle wall 115, the second angle wall 117, or the drop well 119.

FIG. 1F shows a Cartesian coordinate system with X and Y axes imposed on a cross-section of the wheel 100. The origin, where x, y and z=0 is positioned at the intersection of the wheel flange and the centerline (axis of rotation) of the wheel, which defines the X axis. The Y axis extends perpendicularly through the X-axis within the mount flange 101. The variables X and Y in the equations below are measured in the coordinate system shown in FIG. 1F. To provide stability to the fitting algorithms expressed below, the X and Y coordinates in the original measurement coordinate system may be scaled closer to (0, 1). This is done because the model contains exponential terms and power terms and, if the numbers are too large, the corresponding parameters (the theta, etc.) can become too small and cause instability in the fitting algorithm. For that reason, each x1, x2, x3, x4 may be expressed as:

$$Xi=(X-10.271)/0.996$$

And each y1, y2, y3, y4 may be expressed as:

$$Yi=(Y-11.205)/0.705$$

Using this scaling approach, the point (10.271, 11.205) is mapped to (0,0) and the point (11.267, 11.910) is mapped to (1,1). All points are in the XY plane, with the Z value=0.

In accordance with various embodiments, the first angle wall 115, second angle wall 117, and drop well 119 can be sized and shaped to have a tire side profile geometry conforming to the Tire and Rim Association Standard for drop center rims and flat base rims. The valve hole 121, in accordance with various embodiments, can be any size, shape, configuration, and orientation suitable for installation of an inflation valve therein. For example, in some embodiments, as shown in FIG. 1F, the valve hole 121 can include a through hole 123, a tire side counterbore 125, and an inboard counterbore 127.

The disc end flange 111 and the open end flange 113, in some embodiments, can each generally be sized and shaped to have a tire side profile geometry conforming to the Tire and Rim Association Standard for drop center rims and flat base rims. In some embodiments, particular profiles of the tire side and inboard sides of the disc end flange 111 and the open end flange 113 can include particular profile patterns as described in greater detail below with reference to FIG. 2 in order to permit increased load ratings and increased tire pressure ratings without excessively increasing weight or increasing the risk of the tire demounting from the rim. For example, in some embodiments, use of the flange design described below with reference to FIG. 2 can, in part, provide a wheel having a maximum load rating increased from 10,000 lb to 15,000 lb (by a factor of 1.5) and a tire pressure rating increased from 160 PSI to 220 PSI (by a factor of 1.375) while only increasing the weight of the wheel from 25.5 kg (56.3 lb) to 33.1 kg (72.9 lb) (by a factor of 1.298). It will be apparent in view of this disclosure, however, that in some embodiments, the flange design of the subject patent application can be implemented in connection with wheels having any combination of a maximum pressure rating less than 220 PSI and/or any maximum load rating less than 15,000 lb. For example, in some embodiments, the wheel can include a maximum tire pressure rating of 160 PSI and a maximum load rating of 15,000 lb.

In some embodiments, the disc end flange 111 and the open end flange 113 can include mirrored tire side and inboard side profile patterns. In some embodiments, the disc end flange 111 and the open end flange 113 can include different tire side and/or inboard side profile patterns.

The wheel 100, in accordance with various embodiments, can be a single-piece wheel made by forging or casting the wheel 100 using, for example, one or more of impression die forging, cold forging, open die forging, seamless rolled forging, any expendable mold casting (e.g., sand casting, plaster mold casting, shell molding, investment casting), any non-expendable mold casting (e.g., permanent mold casting, die casting, centrifugal casting), gravity filled casting, low-pressure filled casting, high-pressure filled casting, vacuum casting, any other method of forging or casting, or combinations thereof. As used herein, single-piece means that the wheel 100 does not require welding, screwing, bolting, press-fitting, adhering, or otherwise fastening, attaching, or affixing separate parts. By way of non-limiting example, the wheel 100 is formed from a single casting or forging or is additively manufactured. The wheel 100, in accordance with various embodiments can be made from any suitable material including, for example, steel, aluminum, steel alloys, aluminum alloys, any other metal, any other alloy, or combinations thereof including composites, reinforced plastics or materials printed or otherwise deposited and fixed into a structure by additive manufacturing techniques.

In some embodiments, each of the features (e.g., mount flange 101, disc face 103, wheel rim 105, bolt holes 107, hand holes 109, disc end flange 111, open end flange 113, first and second angle walls 115, 117, drop well 119, and valve hole 121) of the wheel 100 can be formed during forging or casting. In some embodiments, one or more of the features of the wheel 100 can be subsequently added by any of one or more suitable techniques such as, for example, turning lathe machining, computer numerical control (CNC) machining, drilling, electrical discharge machining, electro-chemical machining, any other suitable technique, or combinations thereof.

Figure 2:
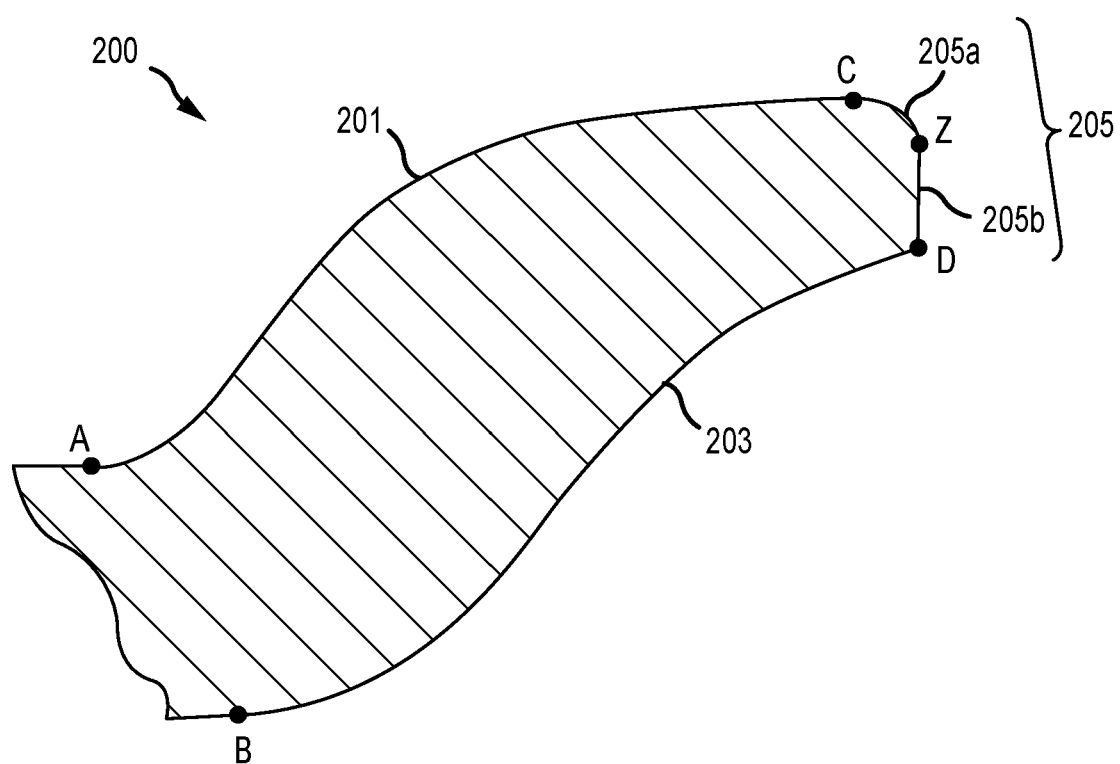
FIG. 2 is an enlarged fragmentary view of a cross-section of an open end flange of the wheel of FIG. 1F.

FIG. 2 illustrates a detail view of an open end flange 200 which can, in accordance with various embodiments, be similar to, but is not limited to, the open end flange 113 discussed above with reference to FIGS. 1A-IF. In the embodiment shown in FIG. 2, the open end flange 200 includes a tire side profile 201 (illustrated diagrammatically as extending between points A and C), an inboard side profile 203 (illustrated diagrammatically as extending between points B and D), and an end profile 205 (illustrated diagrammatically as extending between points C and D) having a first portion 205a (illustrated diagrammatically as extending between points C and Z) and a second portion 205b (illustrated diagrammatically as extending between points Z and D) for connecting the tire side profile 201 to the inboard side profile 203.

The tire side profile 201, in accordance with various embodiments, can be defined by Equation (1):

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2} \quad (1)$$

wherein, for $0 \leq X_1 \leq 1$, aTheta1 can be between −1.004 to −0.974, including, for example, between −0.990 to −0.988 and aTheta2 can be between −1.049 to −1.0182, including, for example, between −1.035 to −1.033. aTheta3 can be between −3.601 to −2.760, including, for example, between −3.231 to −3.131, and between −3.201 to −3.161. aTheta4 can be 18.791 to 25.965, including, for example, between 21.700 to 23.100, between 22.078 to 22.678, and between 22.278 to 23.478. aTheta5 can be between 0.185 to 0.277 including, for example, between 0.225 to 0.236. In one specific embodiment, for $0 \leq X_1 \leq 1$, aTheta1 is −0.989, aTheta2 is 1.034, aTheta3 is −3.181, aTheta4 is 22.378, and aTheta5 is 0.231.

The inboard side profile 203, in accordance with various embodiments, can be defined by Equation (2):

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} + \\ (\text{Alpha0} + \text{Alpha1} \cdot X_2 + \text{Alpha2} \cdot X_2^2 + \text{Alpha3} \cdot X_2^3) \quad (2)$$

wherein, for $0 \leq X_2 \leq 1$, bTheta1 can be between −1.319 to −1.065, including, for example, between −1.212 to −1.172, and −1.202 to −1.182, bTheta2 can be between 0.0001 to 6.277, including, for example, between 2.626 to 3.726, between 2.826 to 3.426, and between 3.026 to 3.226. bTheta3 can be between −7.536 to −2.786, including, for example, between −5.561 to −4.761, between −5.361 to −4.961, and between −5.261 to −5.061. bTheta4 can be between 7.384 to 16.538, including, for example, between 11.161 to 12.861, between 11.461 to 12.461, and between 11.761 to 12.161. bTheta5 can be between −0.234 to −0.159, including, for example, between −0.200 to −0.194. Alpha0, in some embodiments, can be 0. Alpha1 can be between −3.534 to −0.0001, including, for example, between −1.700 to −1.300. Alpha2 can be between 1.090 to 13.597, including, for example, between 6.143 to 8.543, between 6.443 to 8.143, and between 6.943 to 7.743. Alpha3 can be between −16.537 to −10.472, including, for example, between −13.905 to −13.105 and between −13.705 to −13.305. In one specific embodiment, for $0 \leq X_2 \leq 1$, bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

The first portion 205a of the end profile, in accordance with various embodiments, can be defined by Equation (3):

$$y_3 = \text{Beta0} + \text{Beta1} \cdot X_3 + \text{Beta2} \cdot X_3^2 + \text{Beta3} \cdot X_3^3 + \text{Beta4} \cdot X_3^4, \quad (3)$$

wherein, for $0 \leq X_3 \leq 1$, Beta0 can be between −874.899 to −347.942, including, for example, between −801 to −401, between −761 to −461, between −711 to −511, and between −661 to −561, Beta1 can be between 1651.049 to 3667.375, including, for example, between 1859 to 3359, between 2059 to 3159, and between 2359 to 2959, Beta2 can be between −5733.990 to −2841.300, including, for example, between −5087 to −3487, between −4687 to −3887, and between −4487 to −4087, Beta3 can be between 2125.823 to 3969.923, including, for example, between 2447 to 3647, between 2647 to 3447, and between 2847 to 3247. Beta4 can be between 1027.410 to −586.633, including, for example, between −907 to −707 and between −857 to −757. In one specific embodiment, for $0 \leq X_3 \leq 1$, Beta0 is −611.42, Beta1 is 2659.212, Beta2 is −4287.640, Beta3 is 3047.873, and Beta4 is −807.023. The second portion 205b of the third flange profile is defined by Equation (4):

$$X_4 = \text{Constant} \quad (4)$$

for $y_2 < y < y_3$.

The open end flange 200, in some embodiments, the tire side 201 and inboard side 203 profile patterns can be mirrored on a disc end flange. Alternatively, in some embodiments, the disc end flange can include different tire side and/or inboard side profile patterns.

While the present disclosure has been described with reference to certain embodiments thereof, it should be understood by those skilled in the art that various changes may be made and equivalents may be substituted without departing from the true spirit and scope of the disclosure. In addition, many modifications may be made to adapt to a particular situation, indication, material and composition of matter, process step or steps, without departing from the spirit and scope of the present disclosure. All such modifications are intended to be within the scope of the claims appended hereto.

The figures constitute a part of this specification and include illustrative embodiments of the present disclosure and illustrate various objects and features thereof. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

Among those benefits and improvements that have been disclosed, other objects and advantages of this invention will become apparent from the preceding description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive.

Throughout the specification and claims, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on".

In some embodiments, a wheel rim comprising:
a flange profile on a tire side of an open end flange of the wheel rim, the flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

In some embodiments, aTheta3 is between −3.231 to −3.131.

In some embodiments, aTheta3 is between −3.201 to −3.161.

In some embodiments, aTheta 4 is between 21.700 to 23.100.

In some embodiments, aTheta4 is between 22.078 to 22.678.

In some embodiments, aTheta4 is between 22.278 to 23.478.

In some embodiments, aTheta1 is −0.989, aTheta2 is 1.034, aTheta3 is −3.181, aTheta4 is 22.378, and aTheta5 is 0.231.

In some embodiments, a wheel rim comprising:
a flange profile on an inboard side of the open end flange of the wheel rim, the flange profile defined by the equation:

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} + (\text{Alpha0} + \text{Alpha1} \cdot X_2 + \text{Alpha2} \cdot X_2^2 + \text{Alpha3} \cdot X_2^3)$$

wherein, for $0 \leq X_2 \leq 1$, bTheta1 is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

In some embodiments, bTheta1 is between −1.212 to −1.172.

In some embodiments, bTheta1 is between −1.202 to −1.182.

In some embodiments, bTheta2 is between 2.626 to 3.726.

In some embodiments, bTheta2 is between 2.826 to 3.426.

In some embodiments, bTheta2 is between 3.026 to 3.226.

In some embodiments, bTheta3 is between −5.561 to −4.761.

In some embodiments, bTheta3 is between −5.361 to −4.961.

In some embodiments, bTheta3 is between −5.261 to −5.061.

In some embodiments, bTheta4 is between 11.161 to 12.861.

In some embodiments, bTheta4 is between 11.461 to 12.461.

In some embodiments, bTheta4 is between 11.761 to 12.161.

In some embodiments, bTheta5 is between −0.200 to −0.194.

In some embodiments, Alpha1 is between −1.700 to −1.300.

In some embodiments, Alpha2 is between 6.143 to 8.543.

In some embodiments, Alpha2 is between 6.443 to 8.143.

In some embodiments, Alpha2 is between 6.943 to 7.743.

In some embodiments, Alpha3 is between −13.905 to −13.105.

In some embodiments, Alpha3 is between −13.705 to −13.305.

In some embodiments, bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

In some embodiments, the wheel rim incudes a third flange profile connecting the first flange profile and the second flange profile, the third flange profile having a first portion and a second portion, wherein:
the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < _3$.

In some embodiments, Beta0 is between −801 to −401.
In some embodiments, Beta0 is between −761 to −461.
In some embodiments, Beta0 is between −711 to −511.
In some embodiments, Beta0 is between −661 to −561.
In some embodiments, Beta 1 is between 1859 to 3359.
In some embodiments, Beta 1 is between 2059 to 3159.
In some embodiments, Beta 1 is between 2359 to 2959.
In some embodiments, Beta 2 is between −5087 to −3487.
In some embodiments, Beta 2 is between −4687 to −3887.
In some embodiments, Beta 2 is between −4487 to −4087.
In some embodiments, Beta 3 is between 2447 to 3647.
In some embodiments, Beta 3 is between 2647 to 3447.
In some embodiments, Beta 3 is between 2847 to 3247.
In some embodiments, Beta 4 is between −907 to −707.
In some embodiments, Beta 4 is between −857 to −757.
In some embodiments, Beta0 is −611.42, Beta1 is 2659.212, Beta2 is −4287.640, Beta3 is 3047.873, and Beta4 is −807.023.

In some embodiments, the wheel rim includes a disc end flange mirroring the open end flange.

In some embodiments, the wheel rim includes a first angle wall extending from the disc end flange toward the open end flange; a second angle wall extending from the open end flange toward the disc end flange; and a drop well connecting the first angle wall and the second angle wall.

In some embodiments, the wheel rim is formed from at least one of steel, aluminum, steel alloys, aluminum alloys, or combinations thereof.

In some embodiments, a method for making a wheel comprising:
forming by at least one of forging or casting a wheel having a disc face at a disc end, an opposing open end, and a wheel rim extending between the disc face and the open end, the wheel rim including:
a flange profile on a tire side of an open end flange of the wheel rim, the flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

In some embodiments, the step of forming further comprises:

forming a flange profile on an inboard side of the open end flange of the wheel rim, the flange profile defined by the equation:

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} +$$
$$(\text{Alpha0} + \text{Alpha1} \cdot X_2 + \text{Alpha2} \cdot X_2^2 + \text{Alpha3} \cdot X_2^3)$$

wherein, for $0 \leq X_2 \leq 1$, bTheta1 is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

In some embodiments, the step of forming further comprises forming a third flange profile connecting the first flange profile and the second flange profile, the third flange profile having a first portion and a second portion, wherein:

the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < y_3$.

In some embodiments, the step of forming further comprises forming a disc end flange mirroring the open end flange.

In some embodiments, the step of forming further comprises:

forming a first angle wall extending from the disc end flange toward the open end flange;

a second angle wall extending from the open end flange toward the disc end flange; and a drop well connecting the first angle wall and the second angle wall.

In some embodiments, the step of forming further comprises forming a valve hole in at least one of the first angle wall, the second angle wall, or the drop well.

In some embodiments, the step of forming further comprises forming at least one hole in the disc face.

In some embodiments, the step of forming further comprises a mount flange extending radially inward from the disc face.

In some embodiments, the wheel is forged or cast from at least one of steel, aluminum, steel alloys, aluminum alloys, or combinations thereof.

What is claimed is:

1. A wheel rim comprising:
a first flange profile on a tire side of an open end flange of the wheel rim, the first flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

2. The wheel rim of claim 1, wherein aTheta1 is −0.989, aTheta2 is 1.034, aTheta3 is −3.181, aTheta4 is 22.378, and aTheta5 is 0.231.

3. The wheel rim of claim 1, wherein
a second flange profile on an inboard side of the open end flange of the wheel rim is defined by the equation:

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} +$$
$$(\text{Alpha0} + \text{Alpha1} \cdot X_2 + \text{Alpha2} \cdot X_2^2 + \text{Alpha3} \cdot X_2^3)$$

wherein, for $0 \leq X2 \leq 1$, bTheta1 is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

4. The wheel rim of claim 3, wherein bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

5. The wheel rim of claim 3, further comprising a third flange profile connecting the first flange profile and the second flange profile, the third flange profile having a first portion and a second portion, wherein:

the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < y_3$.

6. The wheel rim of claim 5, wherein Beta0 is −611.42, Beta1 is 2659.212, Beta2 is −4287.640, Beta3 is 3047.873, and Beta4 is −807.023.

7. The wheel rim of claim 5, further comprising a disc end flange mirroring the open end flange.

8. The wheel rim of claim 5, further comprising:
a first angle wall extending from the disc end flange toward the open end flange;
a second angle wall extending from the open end flange toward the disc end flange; and
a drop well connecting the first angle wall and the second angle wall.

9. The wheel rim of claim 8, further comprising a mounting flange extending radially inward from the disc face, the mounting flange having a plurality of bolt holes.

10. The wheel rim of claim 5, wherein the wheel rim is formed from at least one of steel, aluminum, steel alloys, aluminum alloys, or combinations thereof.

11. The wheel rim of claim 7, wherein the wheel has a maximum load rating, wherein the wheel has a weight, and wherein an increase in the maximum load rating by a factor of 1.5 results in a corresponding increase in the weight of the wheel by a factor of 1.3.

12. The wheel rim of claim 11, wherein the wheel has a maximum tire pressure rating, and wherein an increase in the maximum tire pressure rating by a factor of 1.375 results in a corresponding increase in the weight of the wheel by a factor of 1.298.

13. A method for making a wheel comprising:

forming the wheel by at least one of forging or casting the wheel, the wheel having a disc face at a disc end, an opposing open end, and a wheel rim extending between the disc face and the open end, the wheel rim including:

a first flange profile on a tire side of an open end flange of the wheel rim, the first flange profile defined by the equation:

$$y_1 = \left(a\text{Theta1} + \frac{1}{(1 + \text{Exp}(a\text{Theta3} + a\text{Theta4} \cdot X_1))^{a\text{Theta5}}}\right) \cdot a\text{Theta2}$$

wherein, for $0 \leq X_1 \leq 1.01$, aTheta1 is between −1.004 to −0.974, aTheta2 is between −1.049 to −1.0182, aTheta3 is between −3.601 to −2.760, aTheta4 is between 18.791 to 25.965, and aTheta5 is between 0.185 to 0.277.

14. The method of claim 13, wherein aTheta1 is −0.989, aTheta2 is 1.034, aTheta3 is −3.181, aTheta4 is 22.378, and aTheta5 is 0.231.

15. The method of claim 13, wherein the step of forming further comprises forming a second flange profile on an inboard side of the open end flange of the wheel rim, the second flange profile defined by the equation:

$$y_2 = \left(b\text{Theta1} + \frac{1}{(1 + \text{Exp}(b\text{Theta3} + b\text{Theta4} \cdot X_2))^{b\text{Theta5}}}\right) \cdot b\text{Theta2} + (\text{Alpha0} + \text{Alpha1} \cdot X_2 + \text{Alpha2} \cdot X_2^2 + \text{Alpha3} \cdot X_2^3)$$

wherein, for $0 \leq X_2 \leq 1$ is between −1.319 to −1.065, bTheta2 is between 0.0001 to 6.277, bTheta3 is between −7.536 to −2.786, bTheta4 is between 7.384 to 16.538, bTheta5 is between −0.234 to −0.159, Alpha0 is 0, Alpha1 is between −3.534 to −0.0001, Alpha2 is between 1.090 to 13.597, and Alpha3 is between −16.537 to −10.472.

16. The method of claim 15, wherein bTheta1 is −1.192, bTheta2 is 3.126, bTheta3 is −5.161, bTheta4 is 11.961, bTheta5 is −0.197, Alpha0 is 0, Alpha1 is −1.500, Alpha2 is 7.343, and Alpha3 is −13.505.

17. The method of claim 15, wherein the step of forming further comprises forming a third flange profile connecting the first flange profile and the second flange profile, the third flange profile having a first portion and a second portion, wherein:

the first portion is defined by the equation:

$$y_3 = \text{Beta0} + \text{Beta1} \cdot X_3 + \text{Beta2} \cdot X_3^2 + \text{Beta3} \cdot X_3^3 + \text{Beta4} \cdot X_3^4,$$

wherein, for $0 \leq X_3 \leq 1$, Beta0 is between −874.899 to −347.942, Beta1 is between 1651.049 to 3667.375, Beta2 is between −5733.990 to −2841.300, Beta3 is between 2125.823 to 3969.923, and Beta4 is between 1027.410 to −586.633; and the second portion is defined by the equation:

$$X_4 = \text{Constant}$$

for $y_2 < y < y_3$.

18. The method of claim 17, wherein the wheel rim further comprises a disc end flange mirroring the open end flange.

19. The method of claim 18, wherein the wheel is forged or cast from at least one of steel, aluminum, steel alloys, aluminum alloys, or combinations thereof.

20. The method of claim 17, wherein $X_4 = 1$.

* * * * *